US006616145B2

United States Patent
Schulten et al.

(10) Patent No.: US 6,616,145 B2
(45) Date of Patent: Sep. 9, 2003

(54) FACE SEAL DEVICE FOR HIGH ROTATIONAL SPEEDS

(75) Inventors: Berthold Schulten, Geretsried (DE); Werner Wolf, Mammendorf (DE); Peter Haselbacher, Geretsried (DE); Thomas Keller, Geretsried (DE)

(73) Assignee: Burgmann Dichtungswerke GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 09/990,281

(22) Filed: Nov. 23, 2001

(65) Prior Publication Data

US 2002/0096836 A1 Jul. 25, 2002

(30) Foreign Application Priority Data

Nov. 23, 2000 (DE) .......................................... 200 19 881

(51) Int. Cl.[7] ................................................ F16J 15/34
(52) U.S. Cl. ...................... 277/360; 277/358; 277/359; 277/399
(58) Field of Search ................................ 277/433, 358, 277/359, 360, 370, 931, 399

(56) References Cited

U.S. PATENT DOCUMENTS

| | | | | |
|---|---|---|---|---|
| 3,804,424 A | * | 4/1974 | Gardner | 277/360 |
| 4,099,728 A | * | 7/1978 | Wiese | 277/399 |
| 4,212,475 A | * | 7/1980 | Sedy | 277/400 |
| 4,407,512 A | * | 10/1983 | Trytek | 277/400 |
| 4,426,092 A | * | 1/1984 | Wiese | 277/399 |
| 4,792,146 A | * | 12/1988 | Lebeck et al. | 277/360 |
| 4,890,851 A | | 1/1990 | Avard et al. | 277/89 |
| 5,490,679 A | * | 2/1996 | Borrino et al. | 277/369 |
| 5,626,347 A | | 5/1997 | Ullah | |
| 5,681,047 A | * | 10/1997 | Klostermann et al. | 277/400 |
| 6,425,583 B1 | * | 7/2002 | Muraki | 277/358 |

FOREIGN PATENT DOCUMENTS

| | | |
|---|---|---|
| EP | 0 380 749 | 8/1990 |
| EP | 0 972 974 | 1/2000 |
| JP | 11344127 | 12/1999 |
| NL | 9 301 417 | 3/1995 |

OTHER PUBLICATIONS

Amrat Parmar, "Designing Out Thermal Distortion Extends Mechanical Face Seal Life", Design Engineering, Morgan–Grampian LTD., London, GB, Aug. 1, 1989, pp. 28, 30, 33 and 36.

Amrat Parmar, "Thermal Distortion Control in Mechanical Seals", World Pumps, Trade and Technical Press LTD., Morden, GB, Nr.. 9, Sep. 1, 1989, pp. 32–39.

N D Barnes, et al, "Design of Pump Chambers for Improved Mechanical Seal Reliability", World Pumps, Trade and Technical Press LTD., Morden, GB, Nr. 307, Apr. 1, 1992, pp. 32–39.

* cited by examiner

Primary Examiner—Flemming Saether
Assistant Examiner—Lisa Bannapradist
(74) Attorney, Agent, or Firm—Sughrue Mion, PLLC

(57) ABSTRACT

A face seal device for use with components rotating at a high rotational speed includes a non-rotating face seal ring (5) and a rotary face seal ring (11) mounted in a loose fit on and rotatable together with the rotary component. The rotary face seal ring includes a sealing face (6) which, in operation, is essentially radially aligned for cooperation with an opposite sealing face (16) of the non-rotating face seal ring. The rotary face seal ring is formed of at least a base portion (20) and an extension portion (21). The extension portion provides an additional mass and has an areal center of gravity axially spaced from the areal center of gravity of the base portion An axial spacing z between the areal centers of gravity and the mass m of the extension portion are in specific relationship with each other, whereby in operation a torque directed towards the non-rotating face seal ring is applied to the rotary face seal ring. This torque arises from the centrifugal forces that are a function of the mass of the extension portion and the spacing between the areal centers of gravity.

9 Claims, 1 Drawing Sheet

FACE SEAL DEVICE FOR HIGH ROTATIONAL SPEEDS

The following disclosure is based on German Utility Model Application No. 200 19 881.5, filed on Nov. 23, 2000, which is incorporated into this application by reference.

FIELD OF AND BACKGROUND OF THE INVENTION

The invention relates to a face seal device for use with components rotating at a high rotational speed.

The invention relates, in particular, to a face seal device for use with turbine engines e.g. in aircraft construction. In applications of this type, it is not permissible to use pairings of ceramic material for the face seal rings although these would be preferable, basically, because of their high wear-resistance properties. Consequently, it is pairings of a steel material that receive prime consideration for the rotary face seal ring, whilst the static face seal ring may consist of a carbon material. At the high rotational speeds involved in such types of applications, and despite the absence of direct contact, the face seal rings may experience a heating effect due to the friction between the cooperating face seal rings and the gaseous or liquid medium in the sealing clearance (molecular friction) to such an extent as to lead to thermally induced distortions or deformations, especially of the rotating face seal ring, whence the geometry of the sealing clearance could be adversely affected. In particular, the sealing clearance may open in the manner of a wedge (formation of a so-called V-gap) thereby resulting in considerably higher leakages.

OBJECTS OF THE INVENTION

One object of the invention is to provide an improved face seal device suitable for high rotational speeds while having minimized leakage. Another object of the invention is to provide a face seal device having a rotary face seal ring which, while it can be made of any suitable material including materials permissible in aircraft construction, avoids detrimental effects in regard to the geometry of the sealing clearance caused by thermally induced distortions of the rotary face seal ring at high rotational speeds.

SUMMARY OF THE INVENTION

These and other objects are solved by a face seal device according to the present invention for use with components rotating at a high rotational speed. According to one formulation of the invention, such a face seal device includes a non-rotating face seal ring and a rotary face seal ring, wherein the rotary face seal ring is formed for mounting in a loose fit on the rotary component for common rotation therewith. The rotary face seal ring includes a sealing face which, in operation, is essentially radially aligned for cooperation with an opposite sealing face of the non-rotating face seal ring. The rotary face seal ring is formed from of least two sub-portions including a base portion and an extension portion. The extension portion creates an additional mass and has an areal center of gravity axially spaced from the areal center of gravity of the base portion such that the axial spacing z between the areal centers of gravity and the mass of the extension portion satisfy the following equation:

$$m*z = k*10^{-2}*\Delta T*\frac{(D-d)*b^2}{r*n^2}*q$$

$$k = \alpha*E$$

where $$k=\alpha*E$$

and where q is in a range between 0.5 and 2.0, preferably between 0.7 and 1.5, and most preferably between 0.8 and 1.3. For the meaning of the symbols used in this equation, reference is made to the following description of a preferred embodiment of the invention.

The at least two sub-portions, which together form the rotary face sealing ring are preferably formed as a single piece or, at least, are rigidly connected with each other. The axial spacing between the center of gravity of the extension portion and that of the base portion is arranged to be such that the rotary face seal ring will be subjected to a specifically oriented torque in correspondence with the spacing between the centers of gravity and the centrifugal forces effective on the extension portion. A thermally induced deformation of the rotary face seal ring is thereby effectively countered and a compensating effect for a change in the geometry of the sealing clearance caused by such a deformation is obtained, so that the desired geometry of the sealing clearance will be maintained even at high rotating speeds even if the rotary face seal ring consists of a steel material which is subjected to incomparably greater thermal distortion than ceramic material due to the different thermal conductivity and co-efficient of thermal expansion of these materials.

BRIEF DESCRIPTION OF THE DRAWINGS

The invention as well as embodiments and advantages thereof are described below in greater detail, by way of example, with reference to the drawings in which.

DETAILED DESCRIPTION OF THE PREFERRED EMBODIMENTS

Figure 1:
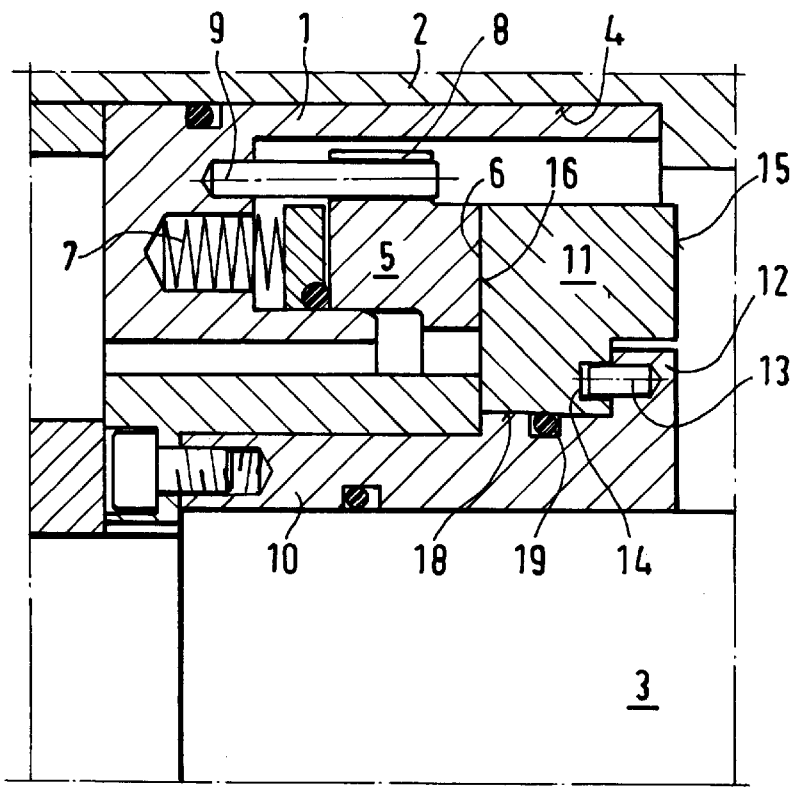
FIG. 1 is a longitudinal sectional view of a face seal device according to a preferred embodiment of the invention, installed in an equipment requiring sealing.
Figure 2:
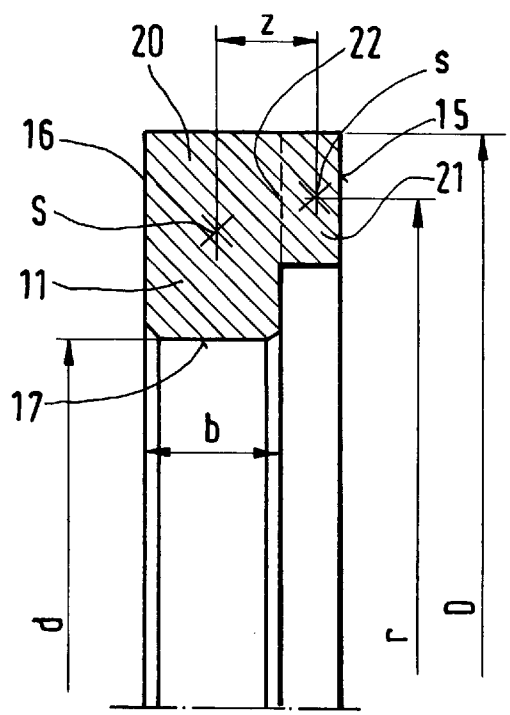
FIG. 2 is a fragmentary sectional view of the rotary face seal ring of the face seal device of FIG. 1.

The invention will be explained in more detail hereinafter with the aid of a preferred embodiment as shown in FIGS. 1 and 2. A seal casing of a face seal device according to the invention bears the reference 1 and can be mounted in a boring 4 of a housing 2 (depicted only in a fragmentary manner in the drawing) of an equipment e.g. a turbine engine for an aircraft. A shaft 3, e.g. the shaft of a turbine wheel, extends through the boring 4 to the exterior. A rotationally stationary face seal ring 5 is mounted axially moveably in the seal casing 1 for cooperation with a rotary face seal ring 11. Provision is further made for a biasing element, e.g. in the form of a biasing spring 7 or a plurality of peripherally distributed biasing springs which are supported at one end on the stationary face seal ring 5 and on the seal casing 1 at the other end thereof, for producing a bias force for urging the stationary face seal ring 5 against the rotary face seal ring 11. The stationary face seal ring 5 is held such that it cannot rotate relative to the seal casing 1. Although other mechanisms could be provided, the present embodiment uses a dog-pin 9 which projects axially from the seal casing 1 and engages in an axial recess 8 in the stationary face seal ring 5 such as to prevent a rotation thereof.

A sleeve 10 is suitably mounted on the shaft 3 such that it cannot rotate relative thereto. The rotary face seal ring 11 is mounted on the sleeve 10 in a loose-fit and is caused to rotate therewith by means of a drive-pin 13 projecting axially from a flange-like end portion 12 of the sleeve 10 and engaging in a boring 14 which is formed in a stepped end face 15 of the rotary face seal ring 11 facing the flange-like end portion 12. The dimensions of the drive-pin 13 and the boring 14 are such that, although they will enable torque to be transferred between the sleeve 10 and the rotary face seal ring 11, there will be sufficient free-play between the parts as to allow the rotary face seal ring 11 to be mounted in a loose-fit on the sleeve 10.

As is shown, the flange-like end portion 12 of the sleeve 10 overlaps only a small radial portion of the rotary face seal ring 11 near the outer end 15 thereof so that the rear part of the rotary face seal ring 11 is held on the sleeve 10 in such a way that it is essentially free of axial support.

The mutually facing, inner end faces of the face seal rings 5, 11 form essentially radially aligned sealing faces 6, 16 between which, in operation, a sealing clearance is produced, which separates the sealing faces 6, 16 so that they do not contact each other. By contrast, the sealing faces 6, 16 are urged together in sealing engagement by the bias force of the spring 7 when the shaft 3 is stationary so as to prevent a medium from leaking along the region between the sealing faces 6, 16 when the sealing device is in a stationary state. If so desired, pumping structures may be formed in one of the sealing faces 6, 16 so as to pump a medium e.g. the medium being sealed, between the sealing faces and thereby assist in the formation of a sealing clearance. Pumping structures of this type are known to a person skilled in the art and thus do not need to be described here in detail.

As illustrated in particular in FIG. 2, the rotary face seal ring 11 includes a base portion 20 and an extension portion 21. The base portion 20 preferably has an essentially rectangular cross-section. The radial and axial dimensions of the base portion 20 are determined by an external diameter D, an internal diameter d and an axial width b. The inner peripheral surface 17 of the rotary face seal ring 11 is mounted in a loose fit on an outer radially projecting peripheral surface portion 18 of the sleeve 10. Provision is made for a secondary seal e.g. in the form of an O-ring 19, which is inserted in an annular groove in the outer peripheral surface portion 18 of the sleeve 10 so as to produce a sealing connection between the peripheral surfaces 17, 18 of the rotary face seal ring 11 and the sleeve 10.

Preferably, the extension portion 21 may, as illustrated, likewise have a rectangular cross-sectional configuration, but, if so desired, it may be designed to have any other arbitrary cross-sectional shape. The extension portion 21 preferably is an integral part on a side of the face seal ring 11 remote from the sealing face 16. Accordingly, the face seal ring 11 is preferably made in one-piece form. However, the extension portion 21 could also be a separate part which is mounted to the base portion 20 in a suitable manner e.g. by welding or by adhesion, and it could consist of the same or of a different steel material than that of the base portion 20. The external diameter of the extension portion 21 may correspond to that of the base portion 20 but it could also differ therefrom.

The virtual axial boundary between the base portion 20 and the extension portion 21 is indicated by a dashed line 22 in FIG. 2 of the drawings. The areal center of gravity of the base portion 20 is referenced S whilst that of the extension portion 21 is referenced s. The radial spacing between the areal center of gravity s of the extension portion 21 and the central longitudinal axis of the face seal device is referenced r whilst the mutual axial spacing between the areal centers of gravity S and s is referenced z.

The extension portion 21 provides an additional mass m for producing centrifugal forces during the operation of the face seal device, acting in a radial plane through the areal center of gravity s. Due to the axial spacing z between the areal center of gravity s and the areal center of gravity S of the base portion 20, a torque is produced by the centrifugal forces, which is effective in a direction such that the rotary face seal ring 11 will be rotated or tilted against the stationary face seal ring 5. Moreover, this action is not hindered, given the loose-fit mounting of the rotary face seal ring 11 relative to the sleeve 10.

Experiments have shown that the mass m of the extension portion 21 and the spacing z of the centers of gravity, required for essentially compensating any tilting of the rotary face seal ring 11 with the resultant undesired formation of a V-gap, can be determined to a near approximation by the following equation:

$$m*z = k*10^{-2}*\Delta T * \frac{(D-d)*b^2}{r*n^2} *q$$

$$k = \alpha * E$$

In the equation:

$\Delta T$ = the temperature difference between the sealing face 16 and the end face 15 of the face seal ring 11 [K],
$n$ = the rotational speed [I/s],
$D$ = the external diameter of the base portion 20 [m],
$d$ = the internal diameter of the base portion 20 [m],
$b$ = the width of the base portion 20 [m],
$E$ = the modulus of elasticity of the material of the face seal ring [N/m²],
$\alpha$ = the co-efficient of thermal expansion of the material of the face seal ring [I/K],
$r$ = the radial spacing of the areal centre of gravity s of the extension portion 21 [m],
$z$ = the mutual axial spacing between the areal centres of gravity S and s [m]
$m$ = the mass of the extension portion 21 [kg].

The factor q should be in a range between 0.5 and 2.0, preferably between 0.7 and 1.5, and most preferably between 0.8 and 1.3.

The manner in which a face seal device of the above-mentioned type functions is as follows.

Due to the frictional heat (molecular friction) occurring in the sealing clearance between the sealing faces 6, 16 at high rotational speeds of the shaft 3, e.g. at rotational speeds of 10,000 min$^{-1}$ and more, despite lack of contact, the rotary face seal ring 11 experiences a heating and shows a temperature gradient from the sealing face 16 to the opposite outer end face 15. The temperature gradient causes the rotary face seal ring 11 to experience a thermally induced distortion or deformation. The distortion is particularly marked if the rotary face seal ring 11 consists of a steel material having a comparatively low heat conductivity $\lambda$ and a high co-efficient of thermal expansion $\alpha$. In a steel material, the ratio of $\alpha/\lambda$ is large in comparison to that of ceramic materials such as SiC or WC. Consequently, if there is a similar development of heat, a rotary face seal ring 11 consisting of a steel material will experience greater distortions than a rotary face seal ring consisting of a ceramic material. The deformation of the rotary face seal ring 11 produced at high rotational speeds due to the thermally induced distortions manifests itself in the form of a corresponding alteration in the configuration of the sealing clearance, in that the sealing clearance is opened at an angle to form a wedge-shaped gap. The consequences of a sealing clearance being altered in this manner would be increased leakage. In accordance with the invention, this is countered by utilizing the centrifugal forces to which the extension portion 21 is subjected at high rotational speeds so as to apply a radial force to the rotary face seal ring 11. This radial force exerts a torque through a lever arm z, thereby causing the face seal ring 11 to experience a rotation which is effective in the sense of a reduction in the angle of the sealing clearance so that the opening of the sealing clearance produced by the thermally induced distortion can be compensated. This compensating torque becomes larger, the higher the rotational speed and, thus, the greater the thermal distortion. By appropriate selection of the mass m of the extension portion 21 and the axial spacing z between the centers of gravity in correspondence with the equation mentioned hereinabove, the compensating effect produced by the torque resulting from the centrifugal force can be optimized and predetermined, within a permissible range of rotational speeds, for each face seal device, so that a full, or a virtually full compensation effect can be achieved for the thermally induced deviations from a desired configuration of the sealing clearance.

Although the invention has been described hereinabove on the basis of a special design for use in connection with the construction of turbines used in aircraft, in which field there are certain reasons for ceramic materials not being permissible for the face seal rings so that a steel material has to be used therefor, it should be understood that the invention is not restricted to face seal rings made of such a material. Rather, the invention can likewise be used, to advantage, for face seal devices utilizing face seal rings of other materials e.g. ceramic materials such as SiC or sintered materials such as WC.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A face seal device for use with a rotary component rotating at a high rotational speed, comprising:

a non-rotating face seal ring; and a rotary face seal ring,
  wherein said rotary face seal ring is mounted in a loose fit on the rotary component for rotation therewith,
  wherein said rotary face seal ring comprises a sealing face which, in operation, is essentially radially aligned for cooperation with an opposite sealing face of said non-rotating face seal ring,
  wherein said rotary face seal ring is formed of at least two sub-portions comprising a base portion and an extension portion,
  wherein the extension portion provides an additional mass and has an areal center of gravity axially spaced from an areal center of gravity of the base portion, and wherein an axial spacing between the areal centers of gravity and the mass of the extension portion satisfies the following equation:

$$m*z = k*10^{-2}*\Delta T*\frac{(D-d)*b^2}{r*n^2}*q$$

$$k = \alpha*E,$$

where $k = \alpha*E,$ where q is in a range between 0.5 and 2.0, and where

| | |
|---|---|
| $\Delta T =$ | the temperature difference between the sealing face and an outer end face of said rotary face seal ring, |
| $n =$ | the rotational speed of said rotary face seal ring, |
| $D =$ | the external diameter of the base portion, |
| $d =$ | the internal diameter of the base portion, |
| $b =$ | the width of the base portion, |
| $E =$ | the modulus of elasticity of the material of said rotary face seal ring, |
| $\alpha =$ | the co-efficient of thermal expansion of the material of said rotary face seal ring, |
| $r =$ | the radial spacing between the areal center of gravity of the extension portion and the central longitudinal axis of the face seal device, |
| $z =$ | the mutual axial spacing between the areal centers of gravity, |
| $m =$ | the mass of the extension portion, | whereby a torque directed towards said non-rotating face seal ring acts on said rotary face seal ring in correspondence with centrifugal forces resulting due to the extension portion and the axial spacing between the areal centers of gravity.

2. The face seal device according to claim 1, wherein q is in a range between 0.7 and 1.5.

3. The face seal device according to claim 1, wherein q is in a range between 0.8 and 1.3.

4. The face seal device according to claim 1, wherein said rotary face seal ring is made of a steel material.

5. The face seal device according to claim 1, wherein said rotary face seal ring is supported in a loose-fit whereby said rotary face seal ring is freely moveable in the axial direction relative to the rotary component.

6. The face seal device according to claim 1, wherein an external diameter of the base portion and an external diameter of the extension portion are essentially equal.

7. The face seal device according to claim 1, wherein the base portion and the extension portion each have an essentially rectangular cross-sectional area.

8. The face seal device according to claim 1, wherein the base portion has an essentially rectangular cross-sectional area and the extension portion has a non-rectangular cross-sectional area.

9. The face seal device according to claim 1, wherein said non-rotating face seal ring is made of a carbon material.

* * * * *